United States Patent
Chihara et al.

(10) Patent No.: US 6,208,428 B1
(45) Date of Patent: Mar. 27, 2001

(54) PRINTING SYSTEM AND CHARGING METHOD THEREOF

(75) Inventors: Tatsuya Chihara; Hiroshi Shiraku, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/082,731

(22) Filed: May 21, 1998

(30) Foreign Application Priority Data

May 21, 1997 (JP) .................................................... 9-130203

(51) Int. Cl.$^7$ ...................................................... G06F 15/00
(52) U.S. Cl. .......................... 358/1.15; 358/1.14; 358/1.13
(58) Field of Search ................................. 358/1.15, 1.14, 358/1.16, 1.17, 1.13, 1.12

(56) References Cited

U.S. PATENT DOCUMENTS

| 5,841,991 | * | 11/1998 | Russell ............................. 395/200.51 |
| 6,031,631 | * | 2/2000 | Tahara et al. ......................... 358/296 |
| 6,075,616 | * | 6/2000 | Nishi ................................... 358/1.15 |

FOREIGN PATENT DOCUMENTS

| 1-241447 | 9/1989 | (JP) | ................................. B41J/3/00 |
| 4-7631 | 1/1992 | (JP) | ................................. G06F/3/12 |
| 4-107741 | 4/1992 | (JP) | ................................. G06F/9/46 |
| 4-128341 | 11/1992 | (JP) | ................................. G06F/3/12 |
| 7-175697 | 7/1995 | (JP) | ................................. G06F/12/00 |
| 7-261868 | 10/1995 | (JP) | ................................. G06F/1/00 |
| 8-69435 | 3/1996 | (JP) | ................................. G06F/15/00 |

* cited by examiner

*Primary Examiner*—Joseph Mancuso
*Assistant Examiner*—Douglas Tran
(74) *Attorney, Agent, or Firm*—Sughrue, Mion, Zinn, Macpeak & Seas, PLLC

(57) ABSTRACT

A charging information of every printing data producer or every section of printing data producers can be easily obtained without increase of cost of a printer and a higher rank device connected to the printer by letting the higher rank device to acquire from the printer values of a total print number counter before transmission of a printing data from the higher rank device to the printer, store the values of the total print number counter correspondingly to a name of the printing data producer attached to the printing data, calculate an accumulated number of prints for every name of printing data producer on the basis of the accumulated value of the total print number counter after the printing of the printing data is completed and record a result of calculation correspondingly to the name of the producer.

29 Claims, 6 Drawing Sheets

PRINTING SYSTEM AND CHARGING METHOD THEREOF

BACKGROUND OF THE INVENTION

The present invention claims priority from Japanese Patent Application No.9-130203 filed May 21, 1997, which is incorporated herein by reference.

1. Field of the Invention

The present invention relates to a printing system for monitoring and controlling a printing operation of a printer, a setting thereof and a charging by an upper computer and, particularly, to a charging processing thereof

2. Description of Related Art

Japanese Patent Application Laid-open No. Hei 1-241447 discloses a technique for charging a cost on a user of a printer, in which the printer is connected through an input/output channel controller to a host computer and a charging of cost is performed on the side of the printer and the charging data on the side of the printer is transferred to the host computer through the input/output channel controller.

A printing system disclosed in the above mentioned Japanese Patent Application is shown in FIG. 1. In the printing system shown in FIG. 1, a host computer 5 exchanges data with an input/output interface 71 through an input/output channel 6 and an input/output channel controller 70 of a printer 7.

The printer 7 includes a central processing unit (CPU) 75 for generally controlling respective portions thereof, a read-only-memory (ROM) 72 for storing a process control program for the CPU 75, a random-access-memory (RAM) 73 for storing various data, flag information and results of operations, etc., of the CPU 75, a data page buffer (DB) 78 for storing the data output from the CPU 75 every page unit, a character pattern generator 77 for converting character codes in the data page buffer 78 into character pattern and supplying it to an output page buffer (PB) 79, an output device 80 for printing a dot information of the output page buffer 79, a disk 76 for storing a charging information and a console 74 for inputting a practical printing information or style and a content of data transferred to the host computer 5.

The input/output interface 71 includes an input/output buffer (IOB) for receiving and transmitting the transfer data and the RAM 73 is provided with an area for a start register (SR) and an end register (ER) for respectively storing a start day and an end day of a charging which are input from the console 74 as an instruction means and to be transferred to the host computer 5 and an area for a date counter (DC) used to count service days.

The charging information is accumulated every time when the output device 80 performs an output operation and stored in the disk 76. When a charging information read request is input from the host computer 5 to the printer 7, a block of data is read out from the disk 76, set in the input/output buffer of the input/output interface 71 and transferred from the input/output buffer to the host computer 5.

In a case where a charging is performed every producer of printing data or every section of printing data producers by the charging method of the above mentioned printing system, the printer itself must be provided with means for recognizing the printing data producers and/or the sections of printing data producers and means for storing the accumulated number of printing sheets (charging information) for every printing data producer or every section of printing data producers, resulting in an increase of cost of the printer.

That is, in the conventional printing system, only the start day and the end day are set and the charging information is obtained within the term defined by these days. Therefore, in order to obtain the charging information of every printing data producer or every section of printing data producers, it is necessary to set the start day and the end day for every printing data producer or every section of printing data producers and to calculate the charging information of every printing data producer or every section of printing data producers. Consequently, it is necessary to provide hardware or memory areas such as RAM's and/or disks separately in the printer, causing the cost of the printer to be increased.

Further, in, for example, a case where a printer is used commonly on a network, it is necessary to identify respective terminals accessing the printer and to calculate the charging information of the respective printers. Further, since a programming interface for totally handling the charging information is not provided, it is impossible to improve the operability of the printer in the network environment.

SUMMARY OF THE INVENTION

In view of the above mentioned problem of the conventional printing system, an object of the present invention is to provide a printing system, a charging method of the printing system and a recording medium recorded with a charging control program of the printing system, which can easily obtain a charging information of every printing data producer or every section of printing data producers without increase of cost of a printer and a higher rank device.

Another object of the present invention is to provide a printing system, a charging method of the printing system and a recording medium recorded with a charging control program of the printing system, which can improve the operability of a printer in a network environment.

According to a first aspect of the present invention, a printing system including a higher rank device and a printer having a total print number counter for counting the number of prints according to an instruction from the higher rank device is featured by that the higher rank device comprises acquiring means for acquiring values of the total print number counter from the printer before a transfer of a printing data from the higher rank device to the printer and after a completion of printing of the printing data, storage means for storing the values of the total print number counter acquired by the acquiring means correspondingly to a name of a printing data producer attached to the printing data, calculator means for calculating an accumulated number of prints of every printing data producer on the basis of the value of the total print number counter accumulated in the storage means after the printing of the printing data is completed and recording means for recording a result of calculation of the calculator means correspondingly to the name of the printing data producer.

According to a second aspect of the present invention, a charging method of a printing system including a higher rank device and a printer having a total print number counter for counting the number of prints according to an instruction from the higher rank device is featured by that the higher rank device executes the steps of acquiring values of the total print number counter from the printer before a transfer of a printing data from the higher rank device to the printer and after a completion of printing of the printing data, accumulating the acquired values of the total print number counter correspondingly to a name of a printing data producer attached to the printing data, calculating an accumulated number of prints of every printing data producer on the basis of the accumulated value of the total print number counter after the printing of the printing data is completed and recording a result of calculation correspondingly to the name of the printing data producer.

According to a third aspect of the present invention, a recording medium recorded with a charging control program of a printing system including a higher rank device and a printer having a total print number counter for counting the number of prints according to an instruction from the higher rank device is featured by that the charging control program instructs the higher rank device to execute the steps of acquiring values of the total print number counter from the printer before a transfer of a printing data from the higher rank device to the printer and after a completion of printing of the printing data, accumulating the acquired values of the total print number counter correspondingly to a name of a printing data producer attached to the printing data, calculating an accumulated number of prints of every printing data producer on the basis of the accumulated value of the total print number counter after the printing of the printing data is completed and recording a result of calculation correspondingly to the name of the printing data producer.

According to a fourth aspect of the present invention, a printing system including a higher rank device and a printer which reports a status and construction thereof to the higher rank device and having a total print number counter for counting the number of prints printed in the printer is featured by that the higher rank device comprises a status storing database for storing data of the status and construction of the printer and noticing a generation of update of the data, printer status monitor means for acquiring data of the status and construction from the printer and storing the data in the status storing database, printing data transfer monitor means for storing a name of a printing data producer attached to a printing data transferred from the higher rank device to the printer and values of the total print number counter from the printer before a transfer of the printing data obtained from the printer and after a completion of printing of the printing data in the status storing database, printer status display means for displaying a current status of the printer by acquiring the data of the status and construction from the status storing database and monitoring a generation of update of the data and print charging log producing means for acquiring the name of the printing data producer on transfer and the number of prints of the printing data from the status storing database every transfer of the printing data from the higher rank device to the printer and producing a record of an accumulated number of prints for every printing data producer.

In the latter construction, the printer status monitor and a printing setting request monitor transmit an information through the status storing database program and a program interface generalizing user interface programs such as printer status window and printer setting change program, etc.

In this construction, the printing data transfer monitor acquires the data producer's information and the values of the total print number counter of the printer immediately before and immediately after the printing is completed and writes them in the status storing database, the charging log producing program reads these two data from the status storing database and produces a charging log file in an external memory of the higher rank device and the value of the charging log file is updated every time when the printing data is printed.

A storing area prepared by the status storing database has a structure which generates an event signal prepared by a basic program of the higher rank device when the stored content is changed on demand. Therefore, the user interface program and the charging log producing program can be operated efficiently by using the event waiting function prepared by the basic program of the higher rank device.

The printing data transfer monitor portion attaches, in starting a transfer of the printing data, a printing job name setting command and a total print number inquiring command to a header of the data and also attaches a total print number inquiring command and a printing job end notice command at an end of the transfer of the printing data.

A combination of the printing job name and the printing data producer name added to the printing data is attached to a correspondence list of the printing job names and the printing data producer names in the status storing database. The printing data is stored in a receiving buffer of the printer and interpreted by a control code emulation program of the printer and the printing job name and the total print number before a printing are noticed from the printer to the printing data transfer monitor of the higher rank device.

The higher rank device specifies the name of the printing data producer in the correspondence list in the status storing database from the job name in printing noticed by the printer and updates the printing job name and the producer's name in the area of a job information in the status storing database to be printed. The higher rank device writes the value of the total print number noticed from the printer in a total print number information area of the status storing database.

In the status storing database, a function of generating the event signal when an information is updated or changed is prepared in addition to the functions of reading and writing information defined in the database. The charging log producing program has a structure in which a monitoring of update events for both the job information in printing and the total print number information is started in initializing the system prior to a transfer of the printing data. The charging log producing program, when receives the event signal, reads the producer's name in the job information in printing and the total print number at the printing start time from the status storing database.

When the printing is started, the total print number counter of the printer increments every ejection of printed sheet. After the printing of the last page completes, the control code emulation program of the printer interprets the total print number inquiring command and the printing job end notice command which are attached to an end of the printing data and notices the total number of prints after the end of printing and the printing job name of the printing data whose printing is completed to the printing data transfer monitor of the higher rank device. The printing data transfer monitor receives the notice to update the total print number information in the status storing database and clear the job information in printing.

The charging log producing program is noticed a change of the job information in printing by the event signal and detects an end of the printing job in monitor. In this case, the charging log producing program reads out the total print number information, decides a difference between the total print number information and the total print number information read out before the printing is started as the number of prints of the printing data and writes the name of the printing data producer and the print number information to a charging log file.

Thus, the higher rank device can manage the charging for the utilization of the printer by merely managing the total print number in the printer. In this case, since it is possible to manage the charging for utilization of the printer without increase of hardware in the printer, there is no increase of cost of the printer as well as the higher rank cost.

According to a fifth aspect of the present invention, a charging method of a printing system including a higher rank device and a printer having a total print number counter for noticing a status and construction thereof to the higher rank device and counting the number of prints printed by and ejected from the printer is featured by that the higher rank device executing the step of storing data of the status and construction of the printer and noticing a generation of update of the data, the step of acquiring the data of the status and construction from the printer and storing the data, the step of storing a name of a printing data and values of the total print number counter before a transfer of the printing data acquired from the printer and after the data is printed by the printer and ejected from the printer, the step of displaying a current status of the printer by acquiring the stored data of the status and construction and monitoring a generation of update of the data and the step of acquiring the name of the producer of the printing data in transfer stored every transfer of the printing data from the higher rank device to the printer and the number of prints printed with the printing data and ejected from the printer and producing a record of the accumulated number of prints for every printing data producer.

According to a sixth aspect of the present invention, a recording medium recorded with a charging control program of a printing system including a higher rank device and a printer having a total print number counter for noticing a status and construction of the printer to the higher rank device and counting the number of prints printed by and ejected from the printer is featured by that the charging control program instructs the higher rank device to store data of the status and construction of the printer and notice a generation of update of the data, to acquire the data of the status and construction from the printer and store the data, to store the name of the printing data producer attached to the printing data transferred from the higher rank device to the printer and values of the total print number counter acquired from the printer before a transfer of the printing data from the higher rank device to the printer and after a printing of the data is completed by the printer and ejected from the printer, to display a current status of the printer by acquiring the data of the status and construction from the status storing database and monitoring a generation of update of the data and to acquire the name of the producer of the printing data in every transfer from the higher rank device to the printer producer and the number of prints printed with the printing data by and ejected from the printer and produce a record of the accumulated number of prints for every producer. It is possible to commonly use the printer by a plurality of client computers by using a server computer as the higher rank device and connecting the client computers to the server computer through a network.

That is, according to a seventh aspect of the present invention, a printing system including a server computer, a plurality of client computers connected to the server computer through a network and a printer which is to be used commonly by the client computers and notices a status and construction of the printer to the server computer is featured by that the server computer comprises a status storing database for storing data of the status and construction of the printer and noticing a generation of update of the data, printer status monitor means for acquiring data of the status and construction from the printer and storing the data in the status storing database, printing data transfer monitor means for storing a name of a printing data producer transferred from the higher rank device to the printer and values of total print numbers before a transfer of the printing data acquired from the printer and after the printing data is printed by and ejected from the printer in the status storing database, printer status display means for displaying a current status of the printer by acquiring the data of the status and construction from the status storing database and monitoring a generation of update of the data and print charging log producing means for producing a record of an accumulated number of prints for every producer's name by acquiring the name of the producer of the printing data in transfer and the number of prints of the printing data from the status storing database every transfer of the printing data from the higher rank device to the printer and network communication means for transmitting an access to the data of the status and construction in the status storing database from the client computers through the network, and that each client computer comprises means for copying the data in the status storing database in the printer through the network communication means and means for monitoring the status and construction of the printer and changing the setting of the printer.

With this construction, it becomes possible for the server computer to manage the charging information of the respective client computers and for each client computer to monitor and/or change of the status, construction and the setting information of the printer through the server computer.

According to an eighth aspect of the present invention, a charging method of a printing system including a server computer, a plurality of client computers connected to the server computer through a network and a printer which is to be used commonly by the client computers and notices a status and construction of the printer to the server computer is featured by that the server computer executes the steps of storing data of the status and construction of the printer and noticing a generation of update of the data, acquiring data of the status and construction from the printer and storing the data in the status storing database, storing a name of a printing data producer transferred from the higher rank device to the printer and values of total print numbers before a transfer of the printing data acquired from the printer and after the printing data is printed by and ejected from the printer in the status storing database, displaying a current status of the printer by acquiring the data of the status and construction from the status storing database and monitoring a generation of update of the data, producing a record of an accumulated number of prints for every producer's name by acquiring the name of the producer of the printing data in transfer and the number of prints of the printing data from the status storing database every transfer of the printing data from the higher rank device to the printer and transmitting an access to the data of the status and construction in the status storing database from the client computers through the network, and that each client computer executes the steps of copying the stored data of the status and construction in the printer by accessing the stored data and monitoring the stored data of the status and construction and changing the setting of the printer.

According to a ninth aspect of the present invention, a recording medium recorded with a charging control program of a printing system including a server computer, a plurality of client computers connected to the server computer through a network and a printer which is to be used commonly by the client computers and notices a status and construction of the printer to the server computer is featured by that the charging control program instructs the server computer to store data of a status and construction of the printer and notice a generation of update of the data, to acquire data of the status and construction from the printer and store the data, to store a name of a printing data producer transferred from the higher rank device to the printer and values of total print numbers before a transfer of the printing data acquired from the printer and after the printing data is printed by and ejected from the printer, to display a current status of the printer by acquiring the data of the status and construction from the status storing database and monitoring a generation of update of the data, to produce a record of an accumulated number of prints for every producers name by acquiring the name of the producer of the printing data in transfer and the number of prints of the printing data every transfer of the printing data from the higher rank device to the printer and to transmit an access to the stored data of the status and construction from the client computers through the network, and that the charging control program instructs each of the client computer to perform the access to copy the data of the status and construction in the printer, to monitor the status and construction of the printer to change the setting of the printer.

BRIEF DESCRIPTION OF THE DRAWINGS

Now, embodiments of the present invention will be described with reference to the accompanying drawings, in which.

DETAILED DESCRIPTION OF PREFERRED EMBODIMENTS

Figure 1:
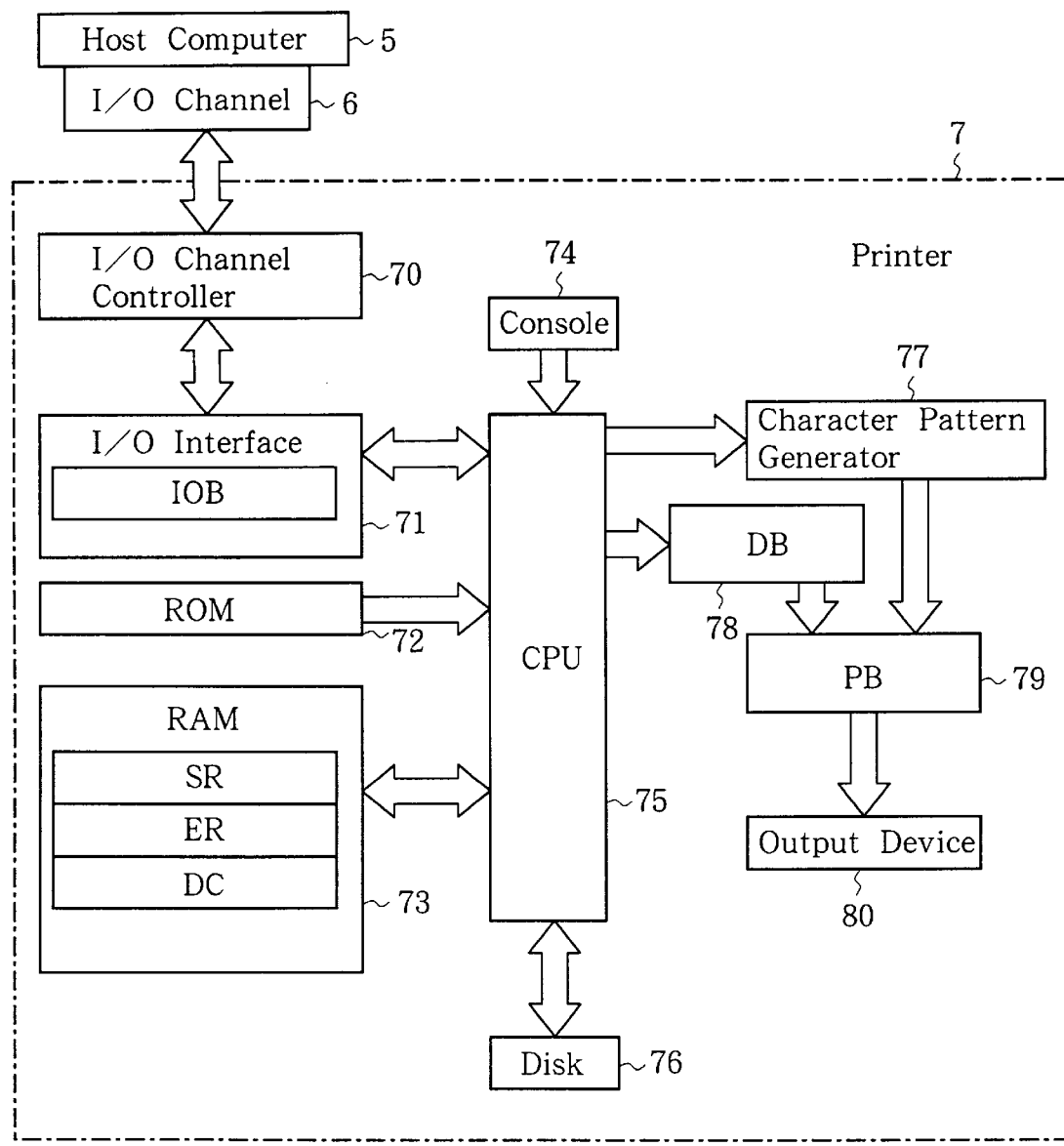
FIG. 1 is a block diagram showing a conventional printing system.
Figure 2:
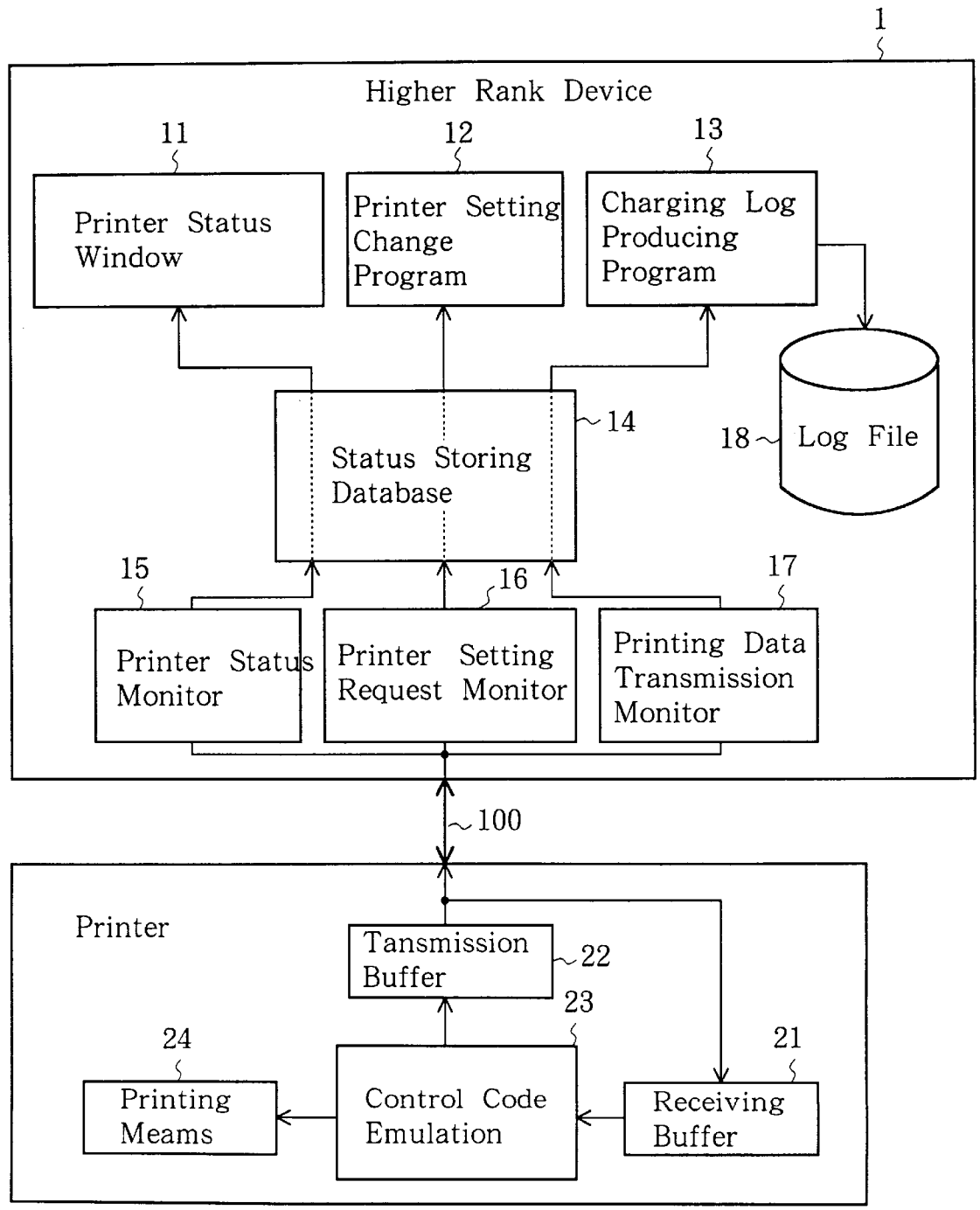
FIG. 2 is a block diagram showing an embodiment of the present invention.

FIG. 2 is a block diagram of an embodiment of the present invention. In FIG. 2, a printing system according to an embodiment of the present invention is constructed with a higher rank device 1, a printer 2 and a bi-directional communication cable 100 connecting between the higher rank device 1 and the printer 2.

The higher rank device 1 is intended to produce a printing data and transfer it to the printer 2 which performs a printing. The higher rank device 1 has a function of specifying a user who is executing a basic program, as a security function of the basic program (not shown).

The higher rank device 1 is constructed with a printer status window 11, a printer setting changing program 12, a charging log producing program 13, a status storing database 14, a printer status monitor 15, a printer setting monitor 16 and a printing data transfer monitor 17. The printer 2 is constructed with a receiving buffer 21, a transfer buffer 22, a control code emulation 23 and a printing means 24.

Among the programs to be executed by the higher rank device 1, the status storing database 14 is a database holding various information abstracting a status and construction of the printer 2. The status storing database 14 responds to a write/read request of a specific information from an external program (not shown) to execute the request and returns a result of execution to the requesting program. Further, the status storing database 14 can issue an event signal prepared by the basic program with respect to an update or change of the specific information in response to a request from an external program.

The printer status monitor 15 monitors a status change of the printer noticed from the printer 2 through the bi-directional communication cable 100 and writes it in the status storing database 14.

The printer status window 11 is intended to display a status of the printer 2 on a screen which is not shown to thereby notify the user of the status of the printer. The printer status window 11 monitors the event signal of update or change of the status information of the printer 2 which has been written in the status storing database 14 by the printer status monitor 15 and updates the screen display at every time of change.

The printer setting request monitor 16 acquires an internal setting state from the printer 2 through the bi-directional communication cable 100 and writes it in the status storing database 14. Further, the printer setting request monitor 16 detects, by an event signal, the fact that the printing setting change program 12 writes the setting change request in the status change database 14, and sends a control code for changing the internal setting to the printer 2.

The printer setting request program 12 displays the internal setting state of the printer 2, which the printer setting request monitor 16 acquired from the printer 2, on the screen to provide a user interface for allowing the user to change the setting. The changed content is written back to the status storing database 14 and, by this change, the printer setting request monitor 16 issues a setting control code to the printer 2.

In transferring a printing data, the printing data transfer monitor 17 attaches a control code for noticing a print job name and a control code for noticing a total print number to a header of the printing data and a control code for noticing the total print number and a control code for noticing an end-of-print job to an end of the printing data and sends the printing data with these control codes to the printer 2 so that the notice is reflected on the status storing database 14 as a job information in printing and a total print number information.

The charging log producing program 13 monitors a change event with respect to the job information in printing and the total print number information written in the status storing database 14 by the printing data transfer monitor 17 and stores an information of a producer of the printing data and an information of the number of prints as a charging log file 18.

The control code emulation 23 in the printer 2 receives the printing data from the higher rank device 1 through the receiving buffer 21 and produces prints by using the printing means 24. Further, a response to the various notice information received through the receiving buffer 21 is sent to the respective monitors in the higher rank device 1 through the transfer buffer 22 and the bi-directional communication cable 100. Incidentally, the printer 2 is provided with a total print number counter (not shown) which counts up every print printed by and ejected from the printing means 24.

Figure 3:
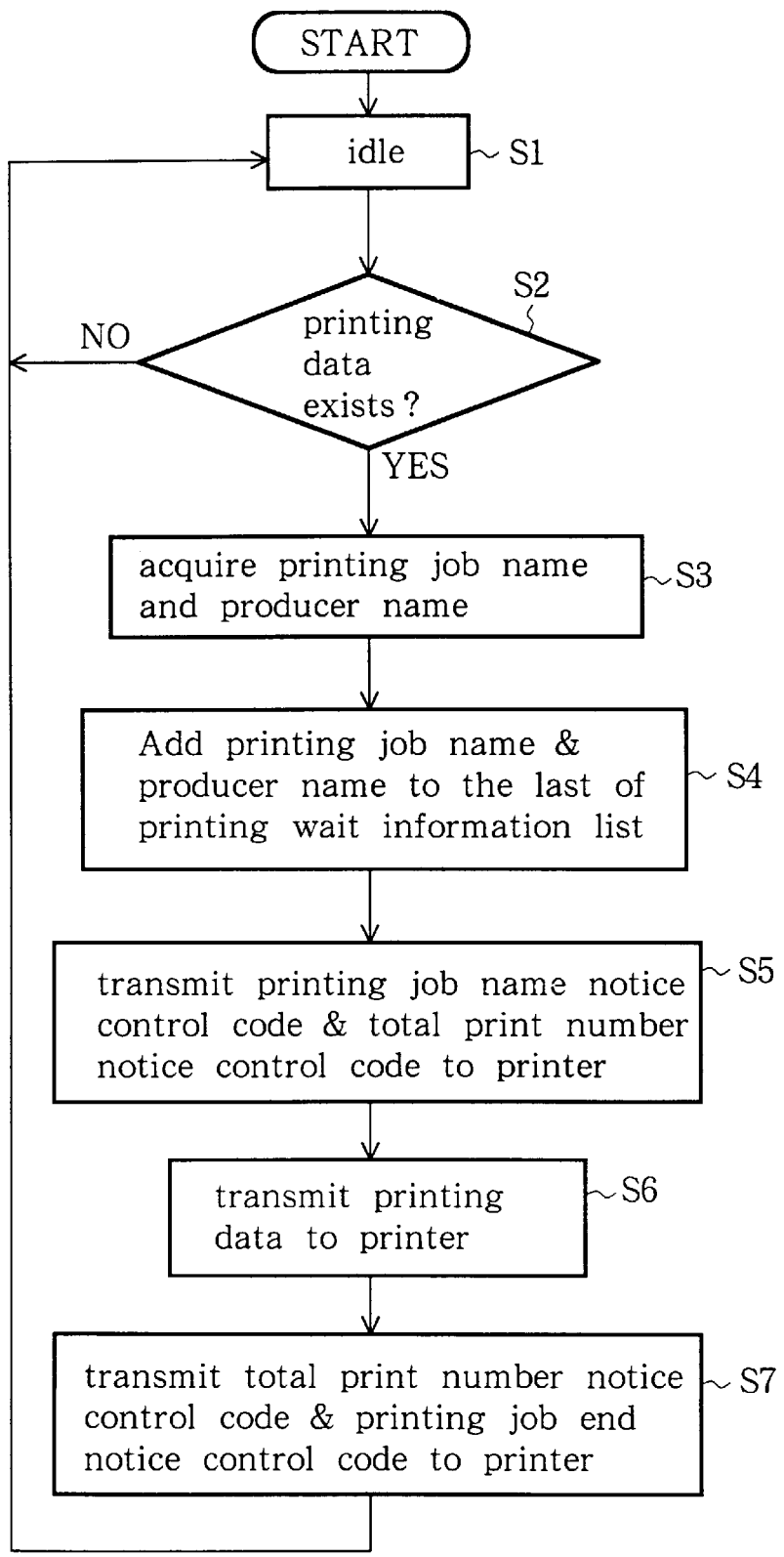
FIG. 3 is a flowchart showing a transfer operation of a printing data according to an embodiment of the present invention.
Figure 4:
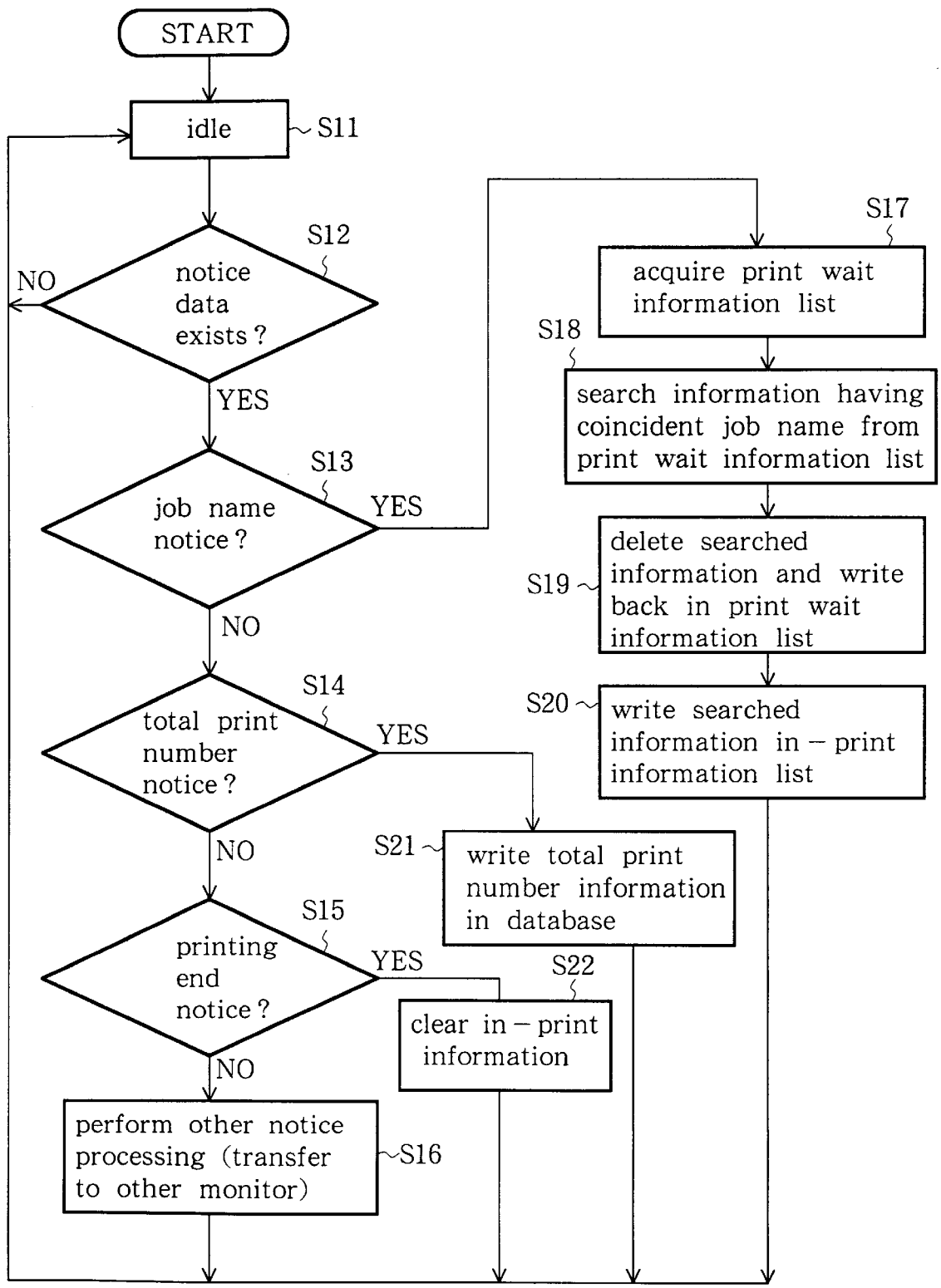
FIG. 4 is a flowchart showing a receiving operation of a printing data from a printer, according to an embodiment of the present invention.
Figure 5:
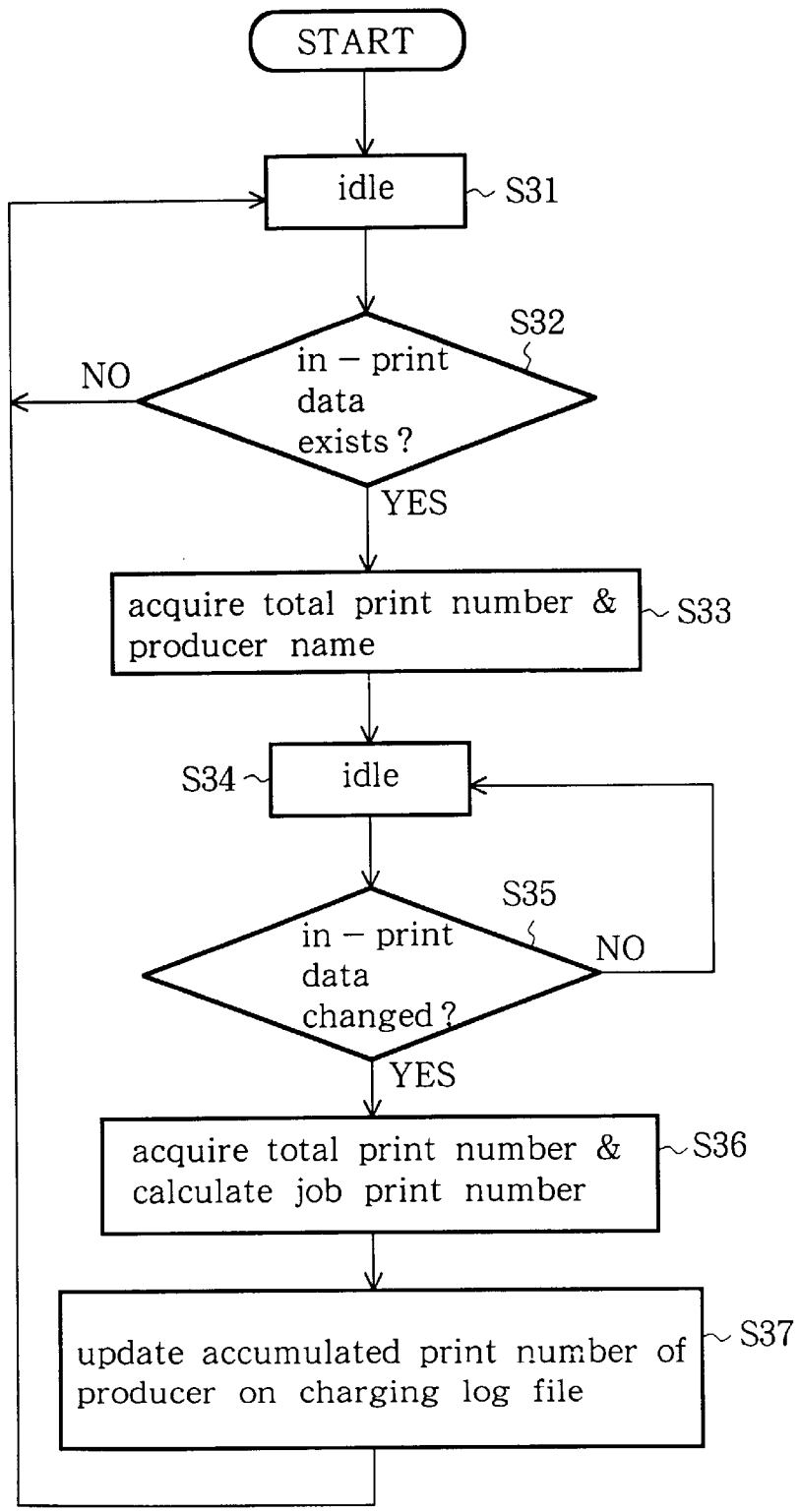
FIG. 5 is a flowchart showing a producing operation of a charging log file according to an embodiment of the present invention.
Figure 6:
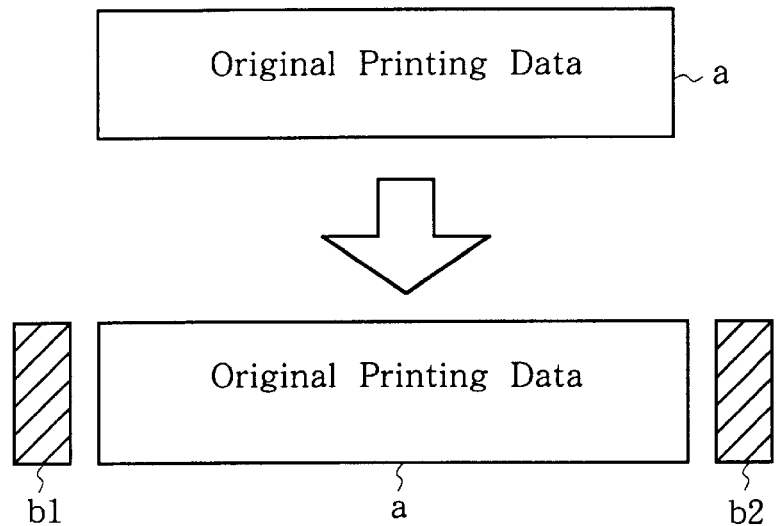
FIG. 6 shows a construction of a printing data according to an embodiment of the present invention.

FIG. 3 is a flowchart showing a transfer operation of the printing data according to an embodiment of the present invention, FIG. 4 is a flowchart showing a notice receiving operation from the printer according to an embodiment of the present invention, FIG. 5 is a flowchart showing a producing operation of the charging log file according to an embodiment of the present invention and FIG. 6 shows a construction of the printing data according to an embodiment of the present invention. An operation of an embodiment of the present invention will be described with reference to FIGS. 2 to 6.

In a case where the user performs a printing by transferring the printing data from the higher rank device 1 to the printer 2, a printing data transfer portion (not shown) of the printing data transfer monitor 10 is shifted from an idle state (step S1 in FIG. 3) to determine whether or not there is the printing data (step S2 in FIG. 3). When the printing data is detected, the printing data transfer portion acquires the print job name and the producer's name of the printing data to be transferred from the basic program (step S3 in FIG. 3) and attaches the information to the last of a print wait information list of the status storing database 14 (step S4 in FIG. 3).

Prior to a transfer of an original printing data a (FIG. 6), the printing data transfer portion transmits a control code b1 (FIG. 6) including a control code for noticing the print job name to the printer 2 and a control code for causing the printer 2 to notice the total print number (step S5 in FIG. 3).

Then, after the original printing data a is transmitted to the printer 2 (step S6 in FIG. 3), a control code b2 (FIG. 6) composed of a control code for noticing an end-of-print and a command to notify a total print number updated by this printing is transmitted (step S7 in FIG. 3). Thereafter, the printing data transmitter portion is returned to the step S1 and enters into the printing data wait state. The above mentioned operation loop is continued until the system is stopped.

When a notice receiving portion (not shown) of the printing data transfer monitor 17 receives the notice from the printer 2, it is shifted from the notice wait state to a step of determining whether or not there is a notice data (steps 11 and 12 in FIG. 4). For example, when the print job name notice control code transmitted in the step S4 is interpreted by the control code emulation 23 of the printer 2, the print job name is sent to the higher rank device 1 as the notice from the printer 2. In this case, when the notice receiving portion determines it as the notice of the job name (step S13 in FIG. 4), it acquires the print waiting information list from the status storing database 14 (step S17 in FIG. 4).

Thereafter, the notice receiving portion searches the print waiting information list on the basis of the noticed job name (step S18 in FIG. 4) and deletes an information related thereto (step S19 in FIG. 4). The deleted information is written in the status storing database 14 as a new in-printing job information (step S20 in FIG. 4).

When the control code emulation 23 interpretes the total print number notice control code, the total print number is sent to the higher rank device 1 as a notice from the printer 2. In this case, when the notice receiving portion determines it as the notice of total print number (step S14 in FIG. 4), the noticed total print number is written in the total print number information of the status storing database 14 (step S21 in FIG. 4).

The end-of-printing notice control code output in the step S7 is interpreted by the control code emulation 23 and, when the end-of-printing notice is sent to the notice receiving portion which determines it as the end of the printing (step S15 in FIG. 4) and clears the in-printing information of the status storing database 14 (step S22 in FIG. 4).

The charging log producing program 13 monitors the in-printing job information in the status storing database 14 on the basis of event signal. The charging log producing program 13 is shifted from an idle state (step S31 in FIG. 5) to a step S32 in FIG. 5. When a generation of the in-printing job information is detected in the step S32, a total print number information and a name of producer of the in-printing job information are acquired from the status storing database 14 (step S33 in FIG. 5) and the operation is returned to the idle state (step 34 in FIG. 5).

When the charging log producing program 13 detects by the event signal that the printing is completed and the in-print job information is updated (step S35 in FIG. 5), the total print number is acquired again from the status storing database 14, a difference between this total print number and the total print number acquired in the step S33 is calculated and the number of prints consumed by the name of the producer of the printing data is obtained (step S36 in FIG. 5). The charging log producing program 13 adds this number of prints to the accumulated number of prints belonging to the name of the printing data producer in the charging log file 18 to update the latter (step S37 in FIG. 5). Then, the charging log producing program 13 enters again into the detection of in-printing job information (steps S31 and 32).

Now, an embodiment of the present invention will be described in detail. In, for example, FIG. 2, it is assumed that the higher rank device 1 is a personal computer and the printer 2 is an electro-photographic page printer which performs a printing in page unit.

The personal computer 1 is provided with an external memory and is operated on a window-based operating system as the basic program. The operating system includes a mechanism for printing data pool. In order to use the operating system on the personal computer 1, a personal log-on certificate is necessary.

The printer status window 11 and the printer setting change program 12 are programs for performing a window display and the status storing database 14 and the charging log producing program 13 are operated as a service program managed by the operating system.

The printer status monitor 15, the printer setting request monitor 16 and the printing data transfer monitor 17 are managed by the spool function of the operating system as an integrated printer monitor.

The status storing database 14 communicates with other programs by a remote procedure call (RPC). The RPC is mounted on the operating system as a remote procedure call mechanism between programs having different process spaces. The status storing database 14 manages an area called "variable" of every printer.

The bi-directional communication cable 100 is a standard IEEE-1284 cable and the bi-directional communication is performed under the bi-directional communication standard defined by IEEE-1284.

The control code emulation 23 of the electro-photographic page printer 2 includes, in addition to the emulation of the page description language for producing print, a control code emulation with which the personal computer 1 controls the acquisition of the status of the electro-photographic page printer 1 and the printing job thereof.

An operation of the embodiment of the present invention described above will be described with reference to FIG. 2. When a printing is started by an application on the personal computer 1, the printing data is sent to the printing data transfer monitor 17 of the printer monitor.

In the printing data transfer monitor 17, the control code b1 composed of the control codes for noticing the total print number and the printing job name and the control code b2 composed of the control codes for noticing the end-of-printing job are attached to the header and the end of the printing data a, respectively, as shown in FIG. 6 and the latter with these control codes is sent to the electrophotographic page printer 2.

Further, the printing data transfer monitor 17 interpretes a notice data produced by interpreting the noticing control codes b1 and b2 in the transferred printing data by the control emulation 23 and writes it in the status storing database program.

The charging log producing program 13 monitors the printing job variable in the status storing database 14 by its event wait function. In this update procedure, the charging log producing program 13 acquires the total pages variable in the status storing database 14 and updates the log file 18 according to the algorithm shown in FIG. 5.

Figure 7:
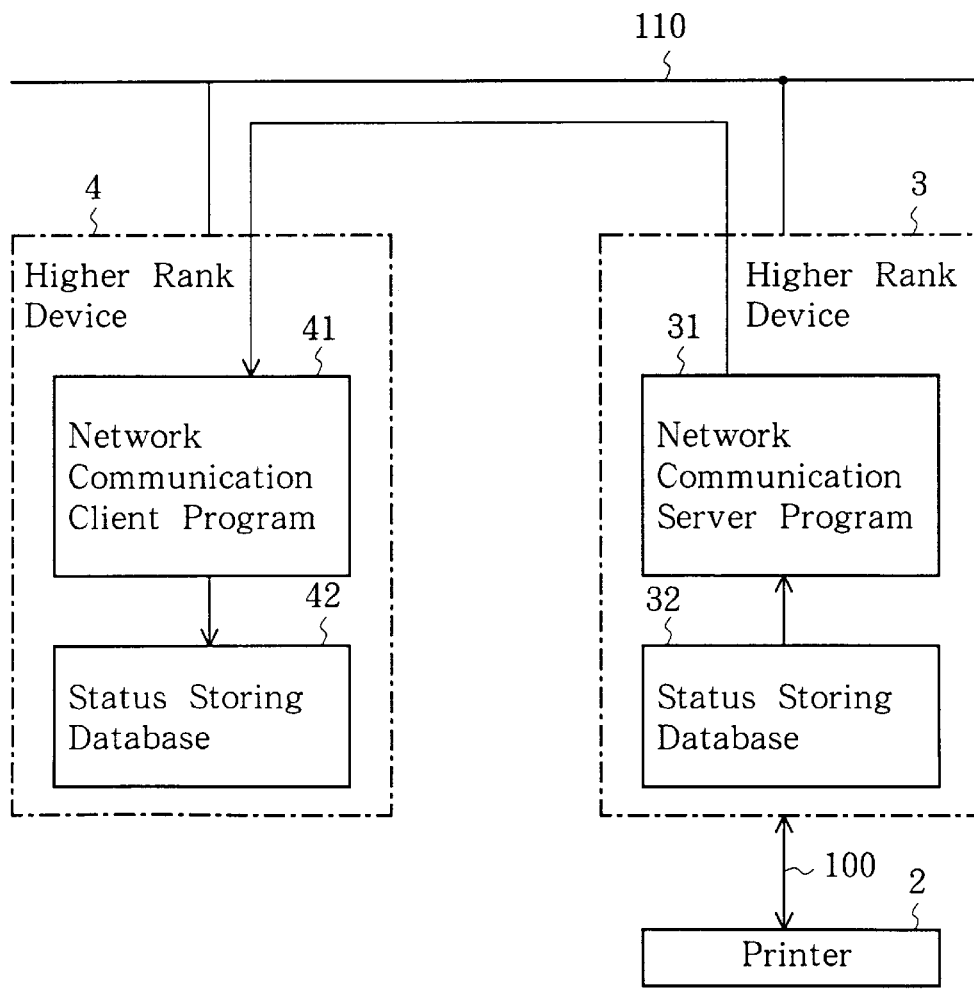
FIG. 7 is a block diagram of another embodiment of the present invention.

FIG. 7 is a block diagram showing a construction of another embodiment of the resent invention. In FIG. 7, a plurality of higher rank devices each shown in FIG. 2 as the higher rank device 1 are provided and one (3) of the higher rank devices to which a printer 2 is connected is connected to the other higher rank devices 4 to which the printer 2 is not connected, through a network 110.

The higher rank devices 3 and 4 can communicate with each other through the network 110 and the printer 2 connected to the higher rank device 3 can prints a printing data from the higher rank device 4 by the function of the basic program.

The printer 2 and the higher rank device 3 are connected each other through a bi-directional communication cable 100. In the higher rank device 3, a network communication server program 31 is executed in addition to the programs of the higher rank device 1 shown in FIG. 2. In the higher rank device 4, a network communication client program 41 is executed in addition to the programs of the higher rank device 1 shown in FIG. 2.

The network communication client program 41 of the higher rank device 4 and the network communication server program 31 of the higher rank device 3 communicate with each other by the RPC through the network 110. The network communication server program 31 monitors a whole information area of a status storing database 32 by event signals and notifies variables which are changed to the network communication client program 41 through the RPC.

The network communication client program 41 acquires values of the notified variables through the network communication server program 31 and writes it in a status storing database 42. With this mechanism, the contents of the status storing databases 32 and 42 are maintained identical.

The status storing databases 32 and 42 store the status and construction of the printer 2 and the setting information thereof, as variables and the network communication client program 41 can communicate with the network server program 31 by the RPC through the network 110 to change the content of the status storing database 32 to thereby change the status, construction and setting information of the printer 2.

Incidentally, other programs than the status storing database 14 of the higher rank device 1 in FIG. 2 are used in the network environment as they are.

As such, it is possible to easily obtain the charging information of every printing data producer or every section of printing data producers without increase of cost by acquiring values of the total print number counter before and after the transmission of the printing data transmitted from the higher rank device 1 or 3 to the printer 2 from the printer 2 by the printing data transfer monitor 17, storing the values of the total print number counter correspondently to the name of the printing data attached to the printing data and calculating an accumulation of print number of every name of the printing data producers by the charging log producing program 13 on the basis of the values of the total print number accumulated in the status storing database 14 after the completion of the printing of the printing data and recording it on the log file 18. Since, in this case, the higher rank device 1 or 3 can manage and hold the charging information by merely monitoring the total print number counter originally provided in the printer 2, it is possible to manage the print charging of the printer 2 without any change of the hardware of the printer 2.

Further, by utilize the external memory originally provided in the higher rank device 1 or 3 as holding means of the charging information, there is no necessity of adding a resource such as special external memory on the side of the printer 2.

Further, it is possible to improve the operability of the printer 2 in the network environment by providing the network communication server program 31 for transmitting an access to the data of the status and construction of the status storing database 32 from the higher rank device 4 which is the client computer by the RPC through the network 110 in the higher rank device 3 which is the server computer and providing the network communication client program 41 for copying the data of the status storing database 32 of the higher rank device 3 in the status storing database 42 of the higher rank device 4 by a communication therewith by the RPC through the network 110, monitoring the status and construction of the printer 2 through the status storing database 32 and changing the setting of the printer 2 in the higher rank device 4.

With such construction, it becomes possible to perform a state display and state setting of the printer 2 connected to one computer and a state display and a state setting of the printer 2 connected to another computer with using one and the same user interface and, therefore, it is possible to improve the operability of the printers 2.

Further, it is possible to improve the security function for realizing the meter rate charging by managing names of the printing data producers and accumulated print numbers thereof on the side of the printer 2.

As described hereinbefore, according to the printing system of the present invention including a higher rank device and a printer including a total print number counter for counting the number of prints according to an instruction of the higher rank device, it is possible without increase of cost of the printer and the higher rank device to easily obtain the charhing information of every printing data producer or every section of printing data producers by obtaining values of the total print number counter from the printer before and after the transmission of the printing data from the higher rank device to the printer and accumulating the values correspondently to the name of the printing data producer attached to the printing data, calculating an accumulated print number of every printing data producer after the printing of the printing data is completed on the accumulated values of the total print number counter and recording a result of calculation correspondently to the names of the printing data producers.

Further, in a printing system including a server computer, a plurality of client computers connected to the server computer through a network and a printer commonly used by the client computers and noticing a status and construction of the printer to the server computer, it is possible to improve the operability of the printer in network environment by transmitting accesses from the client computers to the accumulated data of status and construction through the network, copying the accumulated data of status and construction in the client computers, monitoring the status and construction of the printer by the respective client computers and changing the setting of the printer.

What is claimed is:

1. A printing system including a higher rank device and a printer having a total print number counter for counting the number of prints according to an instruction from said higher rank device, comprising:

acquiring means for acquiring values of the total print number counter from said printer before a transfer of a printing data from said higher rank device to said printer and after a completion of printing of the printing data;

storage means for storing the values of said total print number counter acquired by said acquiring means correspondently to a name of a printing data producer attached to the printing data;

calculator means for calculating an accumulated number of prints of every printing data producer on the basis of the value of said total print number counter accumulated in said storage means after the printing of the printing data is completed; and recording means for recording a result of calculation of said calculator means correspondently to the name of the printing data producer.

2. A printing system as claimed in claim 1, wherein said acquiring means is constructed such that said acquiring means attaches a command requesting a before printing value of said total print number counter before the transmission of the printing data to the printer at a start time of the transmission of the printing data and sends the command to said printer and attaches a command requesting an after printing value of said total print number counter after the printing of the printing data at an end of the transmission of the printing data and sends to command to said printer.

3. A printing system as claimed in claim 1, wherein said calculation means is constructed such that an accumulated number of prints of every name of the printing data producer is calculated by subtracting the value of said total print number counter before the transmission of the printing data from the value of said total print number counter after the end of the printing of the printing data.

4. A charging method of a printing system including a higher rank device and a printer having a total print number counter for counting the number of prints according to an instruction from said higher rank device, comprising the steps of:

acquiring values of the total print number counter from the printer before a transfer of a printing data from the higher rank device to the printer and after a completion of printing of the printing data;

accumulating the acquired values of the total print number counter correspondently to a name of a printing data producer attached to the printing data;

calculating an accumulated number of prints of every printing data producer on the basis of the accumulated value of the total print number counter after the printing of the printing data is completed; and recording a result of calculation correspondingly to the name of the printing data producer.

5. A charging method as claimed in claim 4, wherein the step of acquiring the value of the total print number counter comprises the steps of attaching a command requesting the value of the total print number counter before the transmission of the printing data to the printing data at a start time of the transmission of the printing data and sending the command to the printer and attaching a command requesting the value of the total print number counter after the printing of the printing data to the printing data at an end of the transmission of the printing data and sending to command to the printer.

6. A charging method as claimed in claim 4, wherein the step of calculating the accumulated number of prints of every printing data producer comprises the step of calculating the accumulated number of prints of every name of the printing data producer by subtracting the value of said total print number counter before the transmission of the printing data from the value of said total print number counter after the end of the printing of the printing data.

7. A recording medium recorded with a charging control program of a printing system including a higher rank device and a printer having a total print number counter for counting the number of prints according to an instruction from the higher rank device, wherein the charging control program instructs the higher rank device to execute the steps of acquiring values of the total print number counter from the printer before a transfer of a printing data from the higher rank device to the printer and after a completion of printing of the printing data, accumulating the acquired values of the total print number counter correspondingly to a name of a printing data producer attached to the printing data, calculating an accumulated number of prints of every printing data producer on the basis of the accumulated value of the total print number counter after the printing of the printing data is completed and recording a result of calculation correspondingly to the name of the printing data producer.

8. A recording medium recorded with a charging control program, as claimed in claim 7, wherein the charging control program instructs the higher rank device to execute the steps of, in acquiring the values of the total print number counter, attaching a command requesting the value of the total print number counter before the transmission of the printing data to the printing data at a start time of the transmission of the printing data and sending the command to the printer and attaching a command requesting the value of the total print number counter after the printing of the printing data to the printing data at an end of the transmission of the printing data and sending to command to the printer.

9. A recording medium recorded with a charging control program, as claimed in claim 7, wherein said charging control program instructs the higher rank device to execute the steps of calculating the accumulated number of prints of every name of the printing data producer by subtracting the value of said total print number counter before the transmission of the printing data from the value of said total print number counter after the end of the printing of the printing data.

10. A printing system including a higher rank device and a printer which reports a status and construction thereof to the higher rank device and having a total print number counter for counting the number of prints printed in the printer, comprising:

a status storing database for storing data of the status and construction of said printer and noticing a generation of update of the data;

printer status monitor means for acquiring data of the status and construction from said printer and storing the data in said status storing database;

printing data transfer monitor means for storing a name of a printing data producer attached to a printing data transferred from said higher rank device to said printer and values of said total print number counter from said printer before a transfer of the printing data obtained from said printer and after a completion of printing of the printing data in said status storing database;

printer status display means for displaying a current status of said printer by acquiring the data of the status and construction from said status storing database and monitoring a generation of update of the data; and print charging log producing means for acquiring the name of the printing data producer in transfer and the number of prints of the printing data from said status storing database every transfer of the printing data from said higher rank device to said printer and producing a record of an accumulated number of prints for every printing data producer.

11. A printing system as claimed in claim 10, wherein said printer status monitor means is constructed such that a command requesting the value of said total print number counter before the transmission of the printing data is attached to the printing data at a start time of the transmission of the printing data and sent the command to said printer and a command requesting the value of said total print number counter after the printing of the printing data is attached to the printing data at an end of the transmission of the printing data and sent to said printer.

12. A printing system as claimed in claim 10, wherein said print charging log producing means is constructed such that an accumulated number of prints of every name of said printing data producer is calculated by subtracting the value of said total print number counter before the transmission of the printing data from the value of said total print number counter after the end of the printing of the printing data.

13. A charging method of a printing system including a higher rank device and a printer having a total print number counter for noticing a status and construction thereof to the higher rank device and counting the number of prints printed by and ejected from the printer, wherein the higher rank device executing the step of:

storing data of the status and construction of the printer and noticing a generation of update of the data;

acquiring the data of the status and construction from the printer and storing the data;

storing a name of a printing data and values of the total print number counter before a transfer of the printing data acquired from the printer and after the data is printed by the printer and ejected from the printer;

displaying a current status of the printer by acquiring the stored data of the status and construction and monitoring a generation of update of the data; and acquiring the name of the producer of the printing data in transfer stored every transfer of the printing data from the higher rank device to the printer and the number of prints printed with the printing data and ejected from the printer and producing a record of the accumulated number of prints for every printing data producer.

14. A charging method as claimed in claim 13, wherein the step of storing the name of printing data producer and the values of said total print number counter before the transmission of the printing data and after the printing and ejection comprises the steps of attaching command requesting the value of said total print number counter before the transmission of the printing data to the printing data at a start time of the transmission of the printing data and sending the command to said printer and attaching command requesting the value of said total print number counter after the printing of the printing data to the printing data at an end of the transmission of the printing data and sending to said printer.

15. A charging method as claimed in claim 13, wherein the step of producing a record of an accumulated number of print s of every printing data producer comprising the step of subtracting the value of said total print number counter before the transmission of the printing data from the value of said total print number counter after the end of the printing of the printing data.

16. A recording medium recorded with a charging control program of a printing system including a higher rank device and a printer having a total print number counter for noticing a status and construction of said printer to said higher rank device and counting the number of prints printed by and ejected from said printer, said charging control program instructing said higher rank device to execute the steps of:

storing data of the status and construction of the printer and noticing a generation of update of the data;

acquiring the data of the status and construction from the printer and storing the data;

storing the name of the printing data producer attached to the printing data transferred from the higher rank device to the printer and values of the total print number counter acquired from the printer before a transfer of the printing data from the higher rank device to the printer and after a printing of the data is completed by the printer and ejected from the printer;

displaying a current status of the printer by acquiring the data of the status and construction from the status storing database and monitoring a generation of update of the data; and acquiring the name of the producer of the printing data in every transfer from the higher rank device to the printer producer and the number of prints printed with the printing data by and ejected from the printer and produce a record of the accumulated number of prints for every producer.

17. A recording medium recorded with a charging control program, as claimed in claim 16, wherein the charging control program instructs the higher rank device to execute the steps of attaching command requesting the value of said total print number counter before the transmission of the printing data to the printing data at a start time of the transmission of the printing data and sending the command to said printer and attaching command requesting the value of said total print number counter after the printing of the printing data to the printing data at an end of the transmission of the printing data and sending to said printer.

18. A recording medium recorded with a charging control program, as claimed in claim 16, wherein the charging control program instructs the higher rank device to execute the step of calculating the accumulated number of prints of every name of printing data producer by subtracting the value of said total print number counter before the transmission of the printing data from the value of said total print number counter after the end of the printing of the printing data.

19. A printing system including a server computer, a plurality of client computers connected to said server computer through a network and a printer which is to be used commonly by the plurality of said client computers and notices a status and construction of said printer to said server computer, wherein said server computer comprises:

a status storing database for storing data of the status and construction of said printer and noticing a generation of update of the data;

printer status monitor means for acquiring data of the status and construction from said printer and storing the data in said status storing database;

printing data transfer monitor means for storing a name of a printing data producer transferred from said server computer to said printer and values of total print numbers before a transfer of the printing data acquired from said printer and after the printing data is printed by and ejected from said printer in said status storing database;

printer status display means for displaying a current status of said printer by acquiring the data of the status and construction from said status storing database and monitoring the generation of update of the data;

print charging log producing means for producing a record of an accumulated number of prints for every name of printing data producer by acquiring the name of the producer of the printing data in transfer and the number of prints of the printing data from said status storing database every transfer of the printing data from said server computer to said printer; and network communication means for transmitting an access to the data of the status and construction in said status storing database from the plurality of said client computers through said network, and where each said client computer comprises:

means for copying the data in said status storing database in the printer through said network communication means; and means for monitoring the status and construction of said printer and changing the setting of said printer.

20. A printing system as claimed in claim 19, wherein said printing data transfer monitor means is constructed such that said acquiring means attaches a command requesting the value of said total print number counter before the transmission of the printing data to the printing data at a start time of the transmission of the printing data and sends the command to said printer and attaches a command requesting the value of said total print number counter after the printing of the printing data to the printing data at an end of the transmission of the printing data and sends to command to said printer.

21. A printing system as claimed in claim 19, wherein said charging log producing means is constructed such that an accumulated number of prints of every name of the printing data producer is calculated by subtracting the value of said total print number counter before the transmission of the printing data from the value of said total print number counter after the end of the printing of the printing data.

22. A printing system as claimed in claim 19, further comprising:

printing setting request monitor means for acquiring a setting data of said printer from said status storing database, converting the setting data into a setting change request adaptable to said printer and sending it to said printer; and printing setting change means for displaying a current content of the setting data written in by said printing setting request monitor means through said status storing database and inputting the changed content.

23. A charging method of a printing system including a server computer, a plurality of client computers connected to said server computer through a network and a printer which is to be used commonly by the plurality of said client computers and notices a status and construction of said printer to said server computer, wherein said server computer executes the steps of storing data of the status and construction of said printer and noticing a generation of update of the data, acquiring data of the status and construction from said printer and storing the data in said status storing database, storing a name of a printing data producer transferred from said server computer to said printer and values of total print numbers before a transfer of the printing data acquired from said printer and after the printing data is printed by and ejected from said printer in said status storing database, displaying a current status of said printer by acquiring the data of the status and construction from said status storing database and monitoring a generation of update of the data, producing a record of an accumulated number of prints for every name of printing data producer by acquiring the name of the producer of the printing data in transfer and the number of prints of the printing data from said status storing database every transfer of the printing data from said server computer to said printer and transmitting an access to the data of the status and construction in said status storing database from the plurality of said client computers through said network, and wherein each said client computer executes the steps of copying the stored data of the status and construction in said printer by accessing the stored data and monitoring the stored data of the status and construction and changing the setting of said printer.

24. A charging method as claimed in claim 23, wherein the step of storing the name of printing data producer and the total print numbers before transmission of the printing data and after printed and ejected comprises the steps of attaching a command requesting the value of said total print number counter before the transmission of the printing data to the printing data at a start time of the transmission of the printing data and sending the command to said printer and attaching a command requesting the value of said total print number counter after the printing of the printing data to the printing data at an end of the transmission of the printing data and sending to command to said printer.

25. A charging method as claimed in claim 23, wherein the step of producing an accumulated print number of every printing data producer comprises the step of calculating the accumulated print number of every name of the printing data producer by subtracting the value of said total print number counter before transmission of the printing data from the value of said total print number counter after the end of the printing of the printing data.

26. A charging method as claimed in claim 23, further comprising the steps of acquiring a setting data of said printer from said status storing database, converting the setting data into a setting change request adaptable to said printer and sending it to said printer, displaying a current content of the setting data and inputting the changed content.

27. A recording medium recorded with a charging control program of a printing system including a server computer, a plurality of client computers connected to the server computer through a network and a printer which is to be used commonly by the client computers and notices a status and construction of the printer to the server computer, wherein the charging control program instructs the server computer to store data of a status and construction of the printer and notice a generation of update of the data, to acquire data of the status and construction from the printer and store the data, to store a name of a printing data producer transferred from the higher rank device to the printer and values of total print numbers before a transfer of the printing data acquired from the printer and after the printing data is printed by and ejected from the printer, to display a current status of the printer by acquiring the data of the status and construction from the status storing database and monitoring a generation of update of the data, to produce a record of an accumulated number of prints for every name of printing data producer by acquiring the name of the producer of the printing data in transfer and the number of prints of the printing data every transfer of the printing data from the higher rank device to the printer, and to transmit an access to the stored data of the status and construction from the client computers through the network, and wherein the charging control program instructs each of the client computer to perform the access to copy the data of the status and construction in the printer, and to monitor the status and construction of the printer to change the setting of the printer.

28. A recording medium recorded with a charging control program, as claimed in claim 27, wherein, in acquiring the value of the total print number counter, said server computer attaches a command requesting the value of the total print number counter before the transmission of the printing data to the printing data at a start of transmission of the printing data and sending it to the printer and attaching a command requesting the value of the total print number counter after the printing is completed to the printing data at an end of transmission of the printing data and sending it to the printer.

29. A recording medium recorded with a charging control program, as claimed in claim 27, wherein the charging control program instruct the higher rank device to calculate an accumulated number of prints of every name of printing data producer by subtracting the value of the total print number counter before transmission of the printing data from the value of the total print number counter after the printing of the printing data is completed.

* * * * *